Patented Nov. 14, 1933

1,935,599

UNITED STATES PATENT OFFICE 1,935,599

METHOD OF RETARDING THE DEVELOPMENT OF DECAY DUE TO MOLD GROWTH ON FRUITS AND VEGETABLES AFTER HARVESTING

Hugh F. Rippey, Seattle, Wash., assignor to Laucks Laboratories, Inc., Seattle, Wash., a corporation of Washington No Drawing. Application November 13, 1930
Serial No. 495,429

6 Claims. (Cl. 99—1)

My invention relates to the method of retarding the decay due to mold growth on fruit and vegetables after harvesting. More particularly, my invention relates to the subjecting of fruit and vegetables after harvesting to a bath of water soluble mildly alkaline salts which, while not damaging the fruit in any way, results in inhibiting or very materially retarding the development of decay resulting from mold growth.

It is well recognized that fruit such as apples, pears, quinces, plums, oranges, grapefruit, lemons, etc., are subject to deterioration through decay resulting from the action of molds. Particularly is this true if the skin of the fruit has been broken or abraded during harvesting, handling, packing, shipping, etc., in commercial large scale methods of handling fresh fruit. Decay resulting from the growth of molds has the greatest tendency to develop and spread from such breaks and abrasions unless some inhibiting or retarding agent is used after the harvesting and before final packing of the fruit. Such breaks and abrasions in the skin coating of the fruit, even when very slight, constitute, in effect, a removal of the normal protecting wall afforded by nature.

One primary requirement for such inhibiting or retarding agent is that its use shall not result in damage to the appearance or flavor of the fruit.

A further requisite is that the inhibiting or retarding agent must be sufficiently tasteless to be unnoticeable in any concentrations which may be left upon the fruit and such concentrations must be entirely harmless. This is of special importance due to the fact that the skins of some of the varieties of fruit to be treated with my invention are eaten in fresh form.

A further requisite is that the agent or agents used to accomplish the object must be cheap and readily obtainable in quantities. Also, the agent or agents must be easy and simple to mix, handle and apply. It is important that the reagent or reagents should be of such a character that no matter whether the fruit is rinsed after treatment or not so rinsed, the effectiveness of reagents in retarding the decay due to mold growth is not lost.

I have discovered that if the fruit is washed in a water solution of tri-sodium phosphate or a water solution of sodium carbonate or a water solution of a mixture of the two named salts such fruit will keep for long periods of time without developing decay resulting from action of mold.

Apples, pears and other fruits, as oranges, etc., may be effectively treated with the wash herein described. Experimental results have indicated a very marked inhibiting or retarding of the development of decay due to mold growth, as for example in the following instance:

Apples washed with a five per cent (5%) solution of a fifty-fifty mixture of tri-sodium phosphate and sodium carbonate and subsequently rinsed with fresh water in a packing house in September, 1929, were examined and repacked in the spring of 1930. There was only one-half of one per cent loss in this lot of apples and none of the loss was due to decay arising from action of molds, but due entirely to natural breakdown of the apple tissues due to age.

An exactly similar lot of apples was washed in the same packing house at the same time by other means than my solution. This second lot was examined at the same time as the first lot in the spring of 1930 and found to have suffered a loss of seventeen per cent directly due and traceable to the action of molds.

As another instance of the results obtained by many experiments using my discovery with many lots of various kinds of fruits and vegetables I may cite the following:

In August, 1930, a lot of apples was washed with a seven and one-half per cent (7½%) solution of a fifty-fifty mixture of tri-sodium phosphate and soda ash and subsequently rinsed with fresh water. This lot of apples was placed in common storage (not cold storage) until October 14, 1930, at which time they were examined and shipped. This lot of apples showed approximately nine per cent of stem punctures and was entirely ripe and in spite of these unfavorable conditions there was no evidence of the development of decay due to mold growth.

Examples of vegetables which may be beneficially treated with the solution according to my discovery are potatoes, tomatoes, etc.

I do not restrict myself to the strengths of the solutions given above, since other concentrations are effective without damage to the fruit and vegetables.

It is understood that the fruit and vegetables may be rinsed with clear water after being subjected to treatment with solutions herein described. This is not necessary as any deposit left upon the fruit or vegetables has been found to be harmless. In the interest of economy of operation, it is advisable that the fruit and vegetables be drained after being subjected to treatment with the solutions described herein in order that the solution may not be wasted.

The solution of sodium carbonate and/or the solution of tri-sodium phosphate and/or the solution of sodium carbonate and tri-sodium phosphate (which two salts may be mixed in any relative proportions) may be used at any concentration. The concentration chosen for treatment of any particular lot of fruit or vegetables depends upon whether or not the solution is used (a) warm or cold and (b) whether the solution is to be subsequently rinsed from the fruit or vegetables with clear water or not so rinsed. Naturally, if the solution is not rinsed off the fruit or vegetables, but allowed to dry thereon, a weaker solution may be used than would otherwise be the case.

The use of my invention in the treatment of fresh fruit and vegetables does not involve new or expensive equipment but is fully accommodated by well known commercial appliances now in common use, of the flood or brush or dipping types, or combinations of these.

I claim:

1. The method of retarding development of decay due to mold growth on fruit and vegetables after harvesting, comprising treating fruit or vegetables substantially free from poisonous spray-residue with an aqueous solution of tri-sodium phosphate.

2. The method of retarding development of decay due to mold growth on fruit and vegetables after harvesting, comprising treating fruit or vegetables substantially free from poisonous spray-residue with an aqueous solution containing at least 2 per cent of tri-sodium phosphate.

3. The process of inhibiting mold-decay in fruit and vegetables, which comprises treating mold-carrying citrus fruit substantially free from poisonous spray-residue with an aqueous solution of tri-sodium phosphate in such concentration as will effect inhibition of mold decay.

4. The process of inhibiting mold-decay in fruit and vegetables, which comprises treating mold-carrying apples substantially free from poisonous spray-residue with an aqueous solution of tri-sodium phosphate in such concentration as will effect inhibition of mold-decay.

5. The process of inhibiting mold-decay in fruit and vegetables, which comprises treating mold-carrying citrus fruit substantially free from poisonous spray-residue with an aqueous solution containing at least 2 per cent of tri-sodium phosphate.

6. The process of inhibiting mold-decay in fruit and vegetables, which comprises treating mold-carrying apples substantially free from poisonous spray-residue with an aqueous solution containing at least 2 per cent of tri-sodium phosphate.

HUGH F. RIPPEY.